US009298947B2

(12) United States Patent
Dent et al.

(10) Patent No.: US 9,298,947 B2
(45) Date of Patent: Mar. 29, 2016

(54) METHOD FOR PROTECTING THE INTEGRITY OF A FIXED-LENGTH DATA STRUCTURE

(71) Applicant: QUALCOMM Incorporated, San Diego, CA (US)

(72) Inventors: Alexander W. Dent, San Diego, CA (US); Can Erkin Acar, San Diego, CA (US); Billy B. Brumley, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 137 days.

(21) Appl. No.: 13/762,195

(22) Filed: Feb. 7, 2013

(65) Prior Publication Data
US 2014/0223192 A1 Aug. 7, 2014

(51) Int. Cl.
G06F 21/00 (2013.01)
H04L 9/00 (2006.01)
G06F 21/71 (2013.01)
G06F 21/52 (2013.01)
H04L 9/06 (2006.01)
H04L 9/32 (2006.01)
(Continued)

(52) U.S. Cl.
CPC .............. G06F 21/71 (2013.01); G06F 21/52 (2013.01); G06F 21/64 (2013.01); H04L 9/0643 (2013.01); H04L 9/3242 (2013.01); H04L 63/123 (2013.01)

(58) Field of Classification Search
CPC ..... H04L 9/3242; H04L 63/08; H04L 9/3247; H04W 12/06; H04W 12/10
USPC ......... 380/28–29, 44–47, 277–278; 713/168, 713/189
See application file for complete search history.

(56) References Cited

U.S. PATENT DOCUMENTS 5,351,298 A * 9/1994 Smith ............................ 380/30
7,500,098 B2 3/2009 Paatero
8,108,682 B2 1/2012 Watanabe et al.
(Continued)

FOREIGN PATENT DOCUMENTS

WO WO-2007052045 A2 5/2007

OTHER PUBLICATIONS

"Chapter 7: Block Ciphers ED—Menezes A J; Van Oorschot PC; Vanstone S A", Handbook of Applied Cryptography; [CRC Press Series on Discrete Mathematices and Its Applications], CRC Press, Boca Raton, FL, US, pp. 223-282 , Oct. 1, 1996, XP001525007, ISBN: 978-0-8493-8523-0, Retrieved from the Internet: URL:http://www.cacr.math.uwaterloo.ca/hac/.
(Continued)

Primary Examiner — Alexander Lagor
(74) Attorney, Agent, or Firm — Loza & Loza, LLP

(57) ABSTRACT

One feature pertains to a mechanism to secure a data structure by using a computationally efficient algorithm. A plurality of keys and/or masks may be pre-generated upon boot-up or initiation of a session. An authentication code may be computed for each data structure (e.g., memory block or header block) by selecting a subset of the plurality of pre-generated keys and/or a mask from the plurality of pre-generated masks. The authentication code may be stored within the data structure for future verification of the integrity of the data structure. The keys and/or masks used for all authentication codes (e.g., for other data structures) may be selected from the same plurality of keys and/or masks during the same cycle or session.

38 Claims, 7 Drawing Sheets

(51) Int. Cl.
*G06F 21/64* (2013.01)
*H04L 29/06* (2006.01)

(56) References Cited

U.S. PATENT DOCUMENTS

| | | | |
|---|---|---|---|
| 8,442,226 B2* | 5/2013 | Hauge et al. | 380/217 |
| 8,452,984 B2* | 5/2013 | Garay et al. | 713/190 |
| 2002/0062330 A1* | 5/2002 | Paar et al. | 708/492 |
| 2006/0101407 A1 | 5/2006 | Massarenti et al. | |
| 2006/0161773 A1 | 7/2006 | Okazaki et al. | |
| 2008/0112561 A1* | 5/2008 | Kim et al. | 380/42 |
| 2008/0118060 A1* | 5/2008 | Kim et al. | 380/47 |
| 2008/0222368 A1* | 9/2008 | Gehrmann | 711/152 |
| 2010/0183146 A1* | 7/2010 | Leech | 380/28 |
| 2011/0010547 A1 | 1/2011 | Noda | |
| 2011/0296202 A1 | 12/2011 | Henry et al. | |
| 2011/0296203 A1 | 12/2011 | Henry et al. | |
| 2012/0230492 A1 | 9/2012 | Fujisaki | |

OTHER PUBLICATIONS

"Chapter 9: ED—Menezes A J; Van Oorschot PC; Vanstone S A", Handbook of Applied Cryptography; [CRC Press Series on Discrete Mathematices and Its Applications], CRC Press, Boca Raton, FL, US, pp. 321-383, Oct. 1, 1996, XP001525009, ISBN: 978-0-8493-8523-0, Retrieved from the Internet: URL:http://www.cacr.math.uwaterloo.ca/hac/.

International Search Report and Written Opinion—PCT/US2014/014148—ISA/EPO—May 13, 2014.

Nguyen L.H., et al.,"Short-output universal hash functions and their use in fast and secure message authentication", International Association for Cryptologic Research, vol. 20120404:154833, Feb. 28, 2012, pp. 1-18, XP061005721, [retrieved on Feb. 28, 2012].

\* cited by examiner

METHOD FOR PROTECTING THE INTEGRITY OF A FIXED-LENGTH DATA STRUCTURE

BACKGROUND

1. Field

Various features relate to the protection of data structures from attacks by the use of message authentication codes.

2. Background

Heap memory is reserved by a processor and is organized through the use of a meta-data structure. A meta-data structure may be a fixed-length data structure which contains information (e.g., in a header block) about which variable "owns" the next section of memory (if the memory is assigned) and the amount of memory that is reserved in the corresponding memory block. Attackers may wish to corrupt these meta-data structures (e.g., modify the header blocks) in order to reduce the amount of free memory or to ensure that certain important pieces of data are placed into vulnerable sections of memory. Hence, it is desirable to protect this meta-data (e.g., data in a data structure or header block of a memory block) to prevent unauthorized alteration of data structures.

Therefore, a computationally inexpensive solution is needed to protect data structure.

SUMMARY

A method of generating an authentication code is provided. A set of keys comprising a plurality of distinct keys is pre-generated upon a startup of a processing circuit or a session executed on the processing circuit. A set of masks comprising a plurality of distinct masks is also pre-generated. The set of masks may also be pre-generated upon startup of the processing circuit or the session executed on the processing circuit. At least one of the set of keys and/or set of masks may be generated based on a random value.

A plurality of variable inputs associated with a fixed-length data structure may be obtained. The mask and each of the selected corresponding keys may be selected, at least partially, based on at least one of the plurality of variable inputs.

Each of the plurality of variable inputs may be combined with a selected corresponding key from the set of keys to obtain a plurality of transitory values. The plurality of transitory values may then be combined to obtain an intermediate value. An operation between the intermediate value and a selected mask from the set of masks may then be performed to obtain a message authentication code for the fixed-length data structure. The set of keys may be subdivided into subsets of keys and only a subset of keys (e.g., one key, two keys, etc.) is selected from any single subset of keys to compute the message authentication code.

The at least one of the plurality of variable inputs may be a memory address associated with the fixed-length data structure. Each of the selected corresponding keys may be selected based on the memory address. The selected mask may be selected based on the memory address.

The plurality transitory values may be combined by: (a) adding the plurality of transitory values to obtain a combined value, and/or (b) performing a modulo operation with a pre-selected fixed prime number on the combined value to obtain the intermediate value. The value of each key in the set of keys may be between zero and the pre-selected fixed prime number. The operation between the intermediate value and the selected mask may be, for example, a bitwise exclusive-OR operation.

At least one of the set of masks and set of keys may be stored in a secure memory location for a duration between startups or between sessions. The message authentication code may be stored within the fixed-length data structure in a memory device. The message authentication code may be stored in a header block for the fixed-length data structure.

During a subsequent verification stage, a previously stored message authentication code may be obtained from the data structure. The message authentication code may then be compared to the previously stored message authentication code to ascertain the integrity of the data structure.

Similarly, a device may be provided comprising a memory device and a processing circuit coupled to the memory device. The memory device may serve to store a fixed-length data structure. The processing circuit may be configured or adapted to: (a) pre-generate a set of keys comprising a plurality of distinct keys upon a startup of a processing circuit or a session executed on the processing circuit; (b) pre-generate a set of masks comprising a plurality of distinct masks; (c) obtaining a plurality of variable inputs associated with the fixed-length data structure; (d) combine each of the plurality of variable inputs with a selected corresponding key from the set of keys to obtain a plurality of transitory values; (e) combine the plurality transitory values to obtain an intermediate value; (f) perform an operation between the intermediate value and a selected mask from the set of masks to obtain a message authentication code for the fixed-length data structure.

The set of masks may also be pre-generated upon startup of the processing circuit or the session executed on the processing circuit.

At least one of the set of keys and set of masks are generated based on a random value.

The plurality transitory values may be combined by: (a) adding the plurality of transitory values to obtain a combined value, and/or (b) performing a modulo operation with a pre-selected fixed prime number on the combined value to obtain the intermediate value. The value of each key in the set of keys may be between zero and the pre-selected fixed prime number. The operation between the intermediate value and the selected mask may be a bitwise exclusive-OR operation.

The mask and each of the selected corresponding keys are selected based on at least one of the plurality of variable inputs. The at least one of the plurality of variable inputs is a memory address associated with the fixed-length data structure. Each of the selected corresponding keys is selected based on the memory address. The selected mask may be selected based on the memory address.

The set of keys may be subdivided into subsets of keys and only a subset of keys (e.g., one key, two keys, etc.) is selected from any single subset of keys to compute the message authentication code.

The processing circuit may be further adapted to store at least one of the set of masks and set of keys in a secure memory location for a duration between startups or between sessions.

The processing circuit may also be further adapted to store the message authentication code within the fixed-length data structure in a memory device. The message authentication code may be stored in a header block for the fixed-length data structure.

The processing circuit may be further adapted to: (a) obtain a previously stored message authentication code from the data structure; and/or (b) compare the message authentication code to the previously stored message authentication to ascertain the integrity of the data structure.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

Overview

One feature provides a mechanism to secure a data structure by using a computationally efficient algorithm. A plurality of keys and/or masks may be pre-generated upon boot-up or initiation of a session. An authentication code may be computed for each data structure (e.g., memory block or header block) by selecting a subset of the plurality of pre-generated keys and/or a mask from the plurality of pre-generated masks. The authentication code may be stored within the data structure for future verification of the integrity of the data structure. The keys and/or masks used for all authentication codes (e.g., for other data structures) may be selected from the same plurality of keys and/or masks during the same cycle or session.

This approach may provide less security than other cryptographic message authentication code (MAC) approaches but higher security than a cyclic redundancy check (CRC) or a canary value while having implementation costs that are slightly less than a standard CRC implementation. This solution gains efficiency from the knowledge of the format of the input and by using a larger-than-usual number of random or pseudo-random keys.

Figure 1:
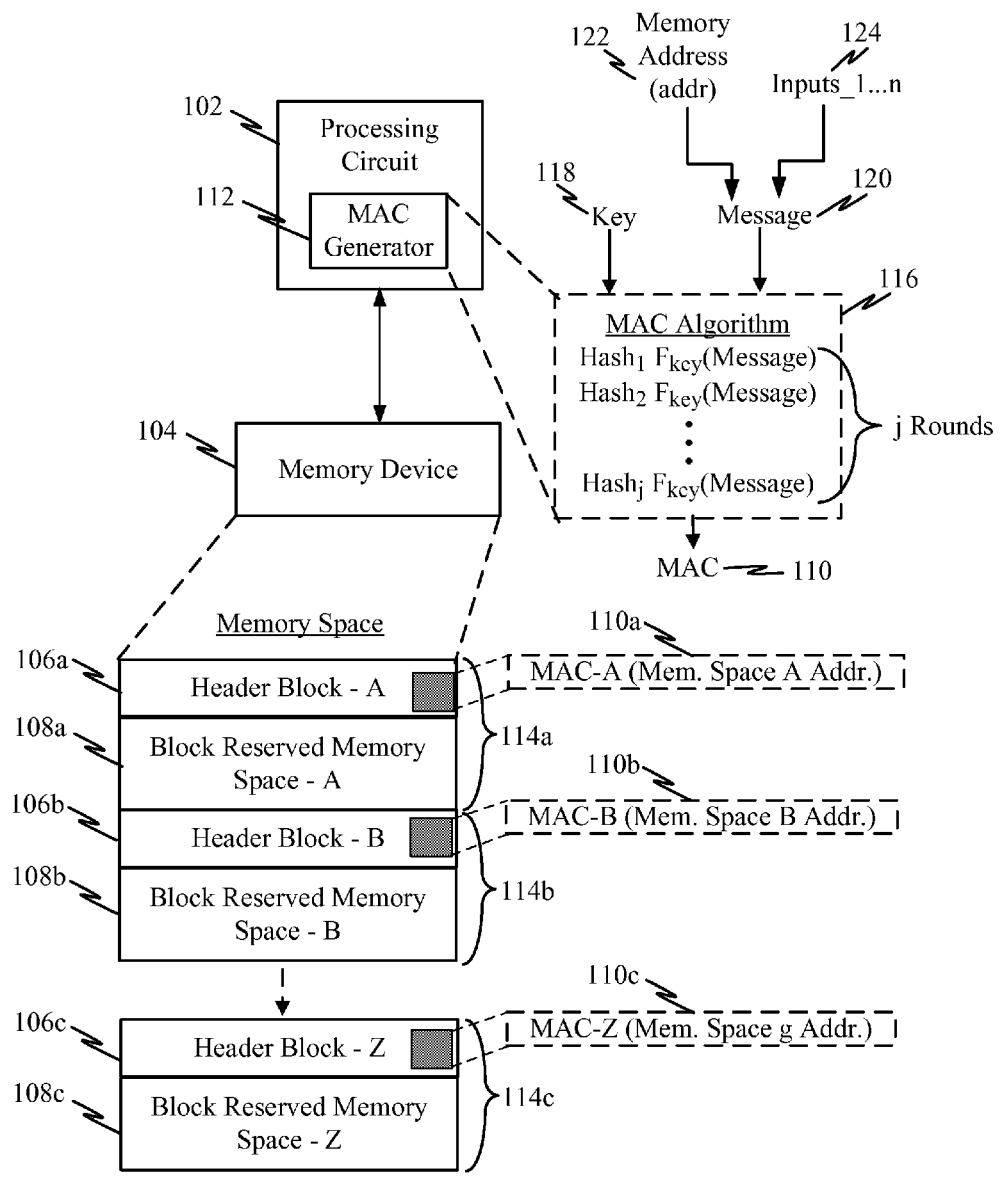
FIG. 1 is a block diagram illustrating one approach to protecting data structures in memory with a message authentication code (MAC) using a cryptographic key which is either stored in a secure, long-term storage or which is randomly generated whenever an associated memory controller boots and which is held in secure, volatile memory.

Exemplary Memory Structure with Dynamically Generated Message Authentication Code FIG. 1 is a block diagram illustrating one approach to protecting data structures in memory with a message authentication code (MAC) using a cryptographic key which is either stored in a secure, long-term storage or which is randomly generated whenever an associated memory controller boots and which is held in secure, volatile memory. A processing circuit 102 may be coupled to, and/or or integrates, a memory device 104 or storage. The memory device 104 may include memory space that is arranged as memory blocks 114a, 114b, and/or 114c. Each memory block 114a, 114b, 114c may include a header block 106a, 106b, and 106c, and a corresponding block reserved memory space 108a, 108b, and 108c. The header block 106 may serve to store a data structure (e.g., meta-data structure).

The processing circuit 102 may be configured to implement a MAC generator 112 that computes a MAC 110 for each header block 106 or memory block 114 and stores such MAC 110 in each corresponding header block 106. In one example, the MAC generator (e.g., a processing circuit or module) may implement a particular MAC algorithm 116 (e.g., Hash-based Message Authentication Code (HMAC)-Secure Hash Algorithm 1 (SHA-1), Advanced Encryption Standard (AES)-cipher-based MAC (CMAC), and Data Authentication Algorithm (DAA), etc.) having multiple rounds or iterations.

A typical MAC algorithm 116, sometimes also called a keyed or cryptographic hash function, accepts as input a secret key 118 and an arbitrary-length message 120 to be authenticated, and outputs a MAC value. The MAC value protects both a message's data integrity as well as its authenticity, by allowing verifiers (who also possess the secret key) to detect any changes to the message content (e.g., header block 106 and/or memory block 114).

In various examples, the MAC algorithm 116 may include, as part of the "message" input 120, a memory address 122 at which the header block begins, the block reserved memory space begins, and/or where specific meta-data in the data structure is held. This MAC could be stored in the data structure (in header block 106) and checked whenever the data structure is read or written. Additionally, the MAC algorithm 116 may also include, as part of the "message" input 120, other inputs 1 . . . n 124 such as content of the header block (e.g., data structure stored therein) and/or commands. Because a MAC 110a, MAC 110b or MAC 110c is computed based on at least some of the information in the corresponding header block 106a, 106b or 106c (e.g., memory address for the memory block 114a or block reserved memory space 108a, size of memory block 114a or block reserved memory space 108a, etc.), any attempt to tamper with the header block 106a, 106b, 106c address for the memory block 114a, 114b, 114c or block reserved memory space 108a, 108b, 108c and/or size of the corresponding memory block 114a, 114b, 114c and/or block reserved memory space 108a, 108b, 108c can be detected by verifying the corresponding MAC 110a, 110b, 110c.

However, this approach has the disadvantage of being computationally expensive, requiring a cryptographic MAC operation every time the data structure (header block 106) is accessed. Typical cryptographic MAC algorithms (e.g., HMAC-SHA-1, AES-CMAC, DAA, etc.) seek to provide greater security by implementing multiple computationally expensive rounds and/or generating pseudo-random mask values when the MAC is computed. As a result, a typical cryptographic MAC operation is computationally intensive and may consume significant processing resources every time a cryptographic MAC is computed.

If a memory block 114 (e.g., and/or the data structure in the corresponding header block 106) is accessed often, which is likely in the case where the data structure holds the information about memory allocation, such as a heap memory structure, then verification of the MAC 110 may consume unacceptable processing resources.

Figure 2:
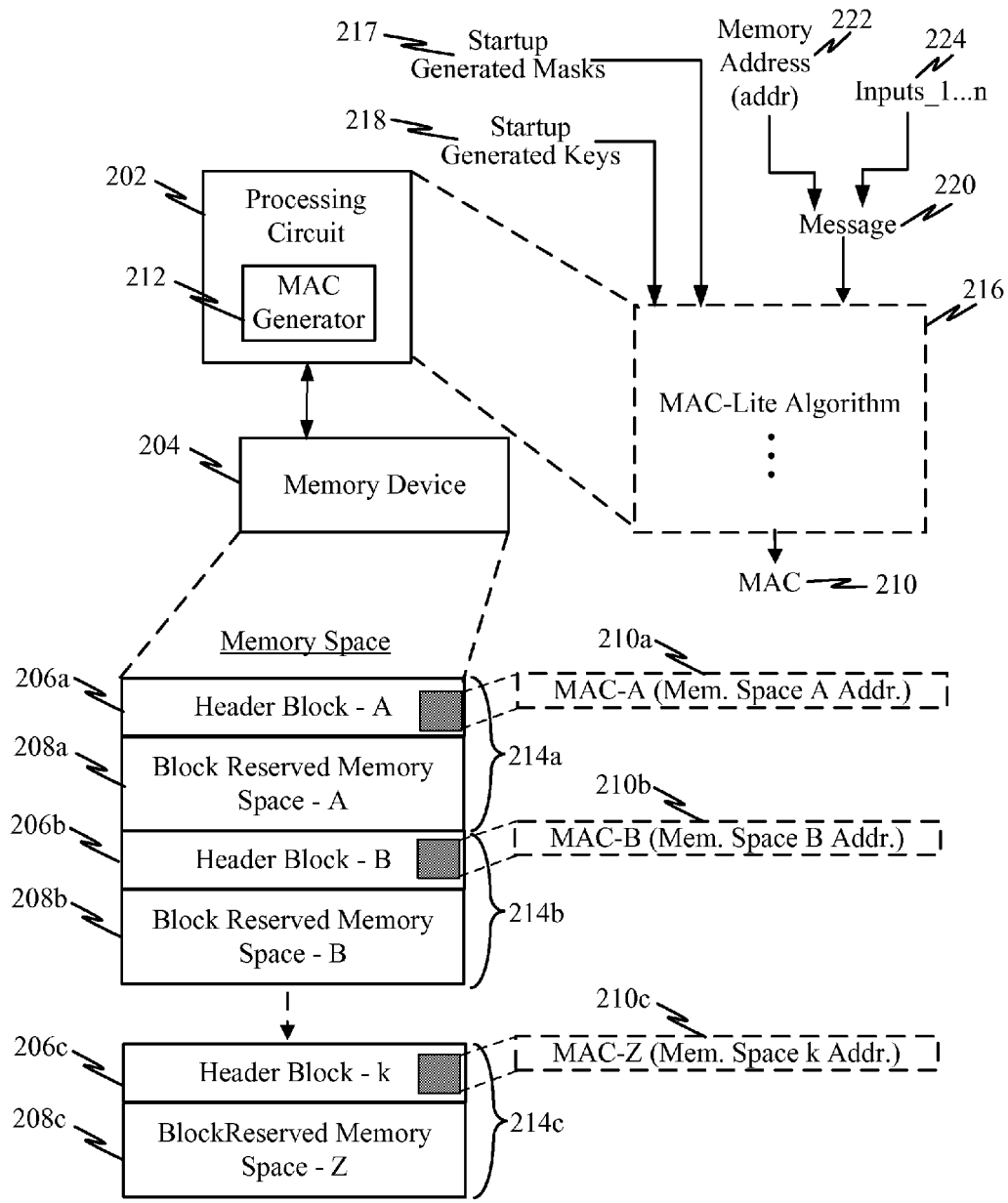
FIG. 2 is a block diagram illustrating another approach to protecting data structures using a MAC-Lite generator that is more computationally efficient than the cryptographic MAC of FIG. 1.

Exemplary Memory Structure with Lite Message Authentication Code Using Pre-Generated Keys and/or Mask FIG. 2 is a block diagram illustrating another approach to protecting data structures using a MAC-Lite generator that is more computationally efficient than the cryptographic MAC of FIG. 1. A processing circuit 202 may be coupled to, and/or or integrates, a memory device 204 or storage. The memory device 204 may include memory space that is arranged as memory blocks 214a, 214b, and/or 214c. Each memory block 214a, 214b, 214c may include a header block 206a, 206b, and 206c, and a corresponding block reserved memory space 208a, 208b, and 208c. The header block 206 may serve to store a data structure (e.g., meta-data structure).

The processing circuit 202 may be configured to implement a MAC-Lite generator 212 that computes a MAC 210 for each header block 206 or memory block 214 and stores such MAC 210 in each corresponding header block 206. In one example, the MAC generator 212 (e.g., a MAC processing circuit or module) may implement a particular MAC-Lite algorithm 216 in which a plurality of startup-generated keys 218 and/or startup-generated masks 217 are used in to generate a MAC for a message input 220 (e.g., data structure).

The plurality of startup-generated keys 218 and/or startup-generated masks 217 may be used to generate MACs in between boot-ups or during an application session. For instance, selected keys and/or masks from the plurality of startup-generated keys 218 and/or startup-generated masks 217 may be used generate all MACs for all data structures during a cycle or session.

In various examples, the MAC-Lite algorithm 216 may include, as part of the "message" input 220, a memory address 222 at which the header block begins, the block reserved memory space begins, and/or where specific meta-data of the data structure is held. At least one of the message inputs (e.g., memory address, etc.) may be used in selecting a distinct plurality one or more keys from the startup-generated keys 218 and/or a mask from the startup-generated masks 217. The selected keys and/or mask are then used to generate the MAC 210 while avoiding multiple computationally expensive rounds and/or the computation of pseudo-random mask values at run-time.

Additionally, the MAC algorithm 216 may also include, as part of the "message" input 220, other inputs 1 . . . n 224 such as content of the header block (e.g., data structure stored therein). Because a MAC 210a, 210b or 210c is computed based on at least some of the information in the corresponding header block 206a, 206b or 206c (e.g., memory address for the memory block 214a or block reserved memory space 208a, size of memory block 214a or block reserved memory space 208a, etc.), any attempt to tamper with the header block 206a, 206b, 206c address for the memory block 214a, 214b, 214c or block reserved memory space 208a, 208b, 208c and/or or size of the corresponding memory block 214a, 214b, 214c and/or block reserved memory space 208a, 208b, 208c can be detected by verifying the corresponding MAC 210a, 210b, 210c.

This MAC 210 may be stored in the data structure (in header block 206) and checked whenever the data structure is accessed (e.g., read or write operation).

Figure 3:
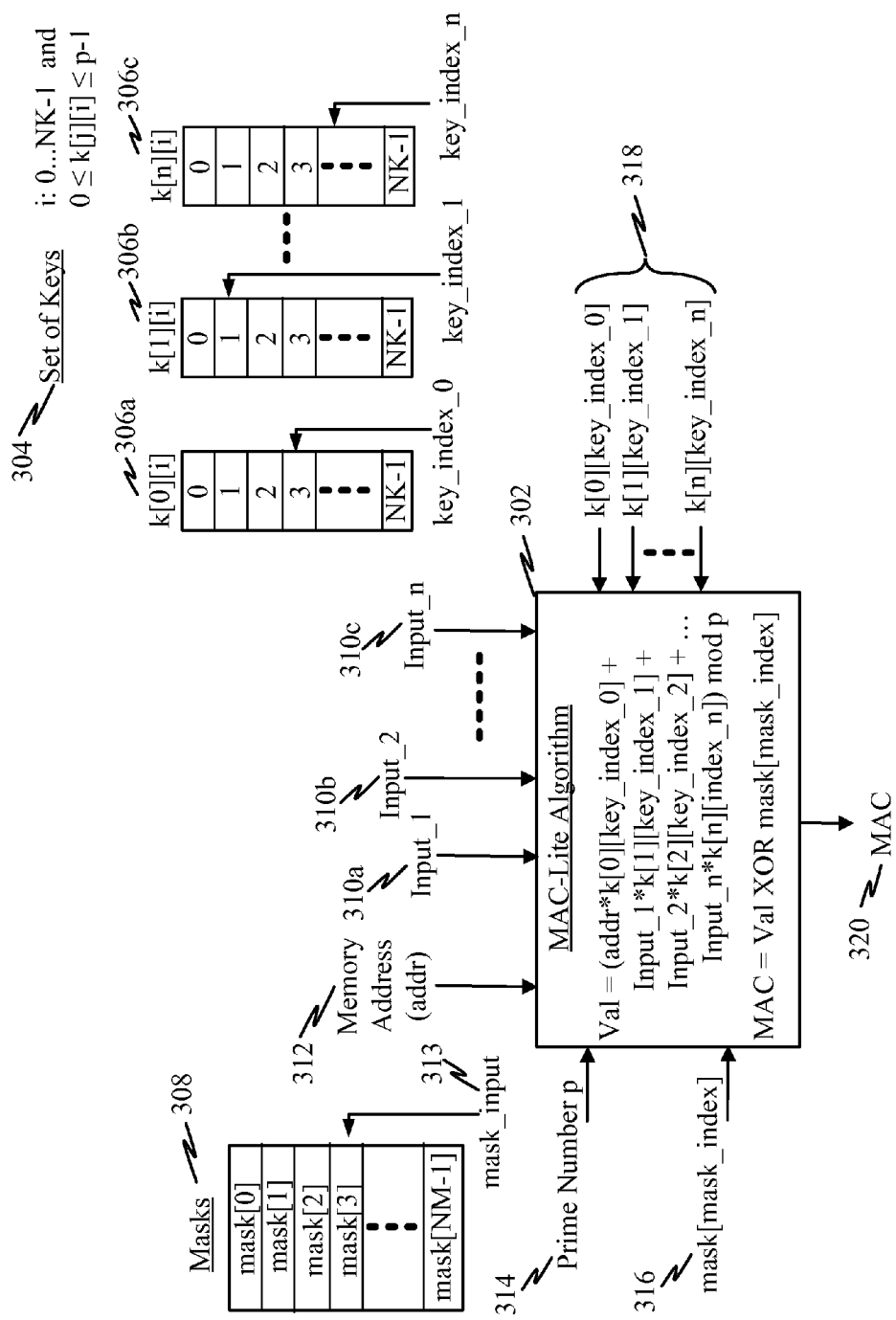
FIG. 3 illustrates an example of a MAC-Lite algorithm 302 that is more computationally efficient than the cryptographic MAC of FIG. 1 while having higher security than a cyclic redundancy check (CRC) or a canary value.

FIG. 3 illustrates an example of a MAC-Lite algorithm 302 that is more computationally efficient than the cryptographic MAC of FIG. 1 while having higher security than a cyclic redundancy check (CRC) or a canary value. This MAC-Lite algorithm 302 may be implemented, for example, by the MAC-Lite generator 212 in FIG. 2.

In this approach, a set of keys 304 and/or masks 306 may be pre-generated at boot-time and/or startup and may be subsequently used (e.g., during an entire session) to generate MACs for one or more memory blocks. For instance, a plurality of keys 304 k[0][0], . . . , k[n][NK−1] may be randomly or pseudo-randomly generated (e.g., generated based on a random or pseudo-random value). In this example, the plurality of keys 304 k[0][0], . . . , k[n][NK−1] have been grouped into a plurality of subsets 306a, 306b, and 306c, including a first subset of keys 306a k[0][0], . . . , k[0][NK−1], a second subset of keys 306b k[1][0], . . . , k[1][NK−1], and a third subset of keys 306c k[n][0], . . . , k[n][NK−1]. These key values should be secret and unchangeable by a potential attacker.

Similarly, a plurality of mask values 308, including mask[0], mask[1], . . . , mask[NM−1], may be pre-generated at boot-time and/or startup and may be subsequently used (e.g., during an entire session) to generate the MACs for one or more memory blocks.

In this example, the MAC-Lite algorithm 302 may take as inputs: a plurality of inputs Input_1 310a, Input_2 310b, and Input_n 310c, a variable memory address 312, a pre-selected or pre-determined prime number p 314, a selected mask 316, and/or a selected plurality of keys 318 selected from the set of keys 304. In one example, the mask values 308 mask[0], mask[1], . . . , mask[NM−1] may each be of the same bit-length as the prime number p 314. Additionally, the key values k[0][0], . . . , k[n][NK−1], in the set of keys 304, may be between 0 and p−1 (inclusive).

For a given memory block, a MAC may be generated using the MAC-Lite algorithm 302. The plurality of keys 318 may be selected from the set of keys 304 based on, for example, one or more indices generated from the variable memory address 312. For example, a function f and the variable memory address 312 addr may serve to generate the key indices: f(addr)=key_index_0, . . . , key_index_n. For instance, each of the key indices may be between integer values 0 and NK−1. Consequently, the selected set of keys 318 may be selected from each of the subsets 306a, 306b, and 306c of the plurality of keys 304.

Similarly, the mask 316 may be selected from plurality of mask values 308 based on, for example, an index generated from the variable memory address 312. For example, the same or different function f and the variable memory address 312 addr may serve to generate the mask index: f(addr)=mask_index. For instance, the mask_index 313 may be between integer values 0 and NM−1. Consequently, a mask 316 may be selected from the plurality of masks 308.

The selected plurality of keys 318, the selected mask 316, the prime number p 314, and the variable memory address 312, input_1 310a, input_2 310b, . . . , input_n 310 may be combined in a way that produces a MAC output that is hard to predict. For the case of memory management, the variable memory address (addr) 312 may be, for example, a starting address for a header block of memory structure). Likewise, the plurality of other input variables input_1 310a, input_2 310b, ..., input_n 310c may be different variables in the data structure or header block. The MAC-Lite algorithm 302 may be parameterized by the prime number p 314 which may be larger than any possible individual input (e.g., k(j)[i]≤p−1), which can be determined owing to the assumption that the input characteristics for the MAC-Lite algorithm 302 are known. This prime number p 314 may be smaller than some possible inputs (e.g., selected keys 318, selected mask 316, memory address 312, and/or inputs 310) as long as it is possible to efficiently map the set of a possible inputs to a set of inputs that are all guaranteed to be less than the prime number p 314 in a bijective way. This also allows small inputs to be combined into one larger variable. This prime number p 314 can be made public, but should not be changeable by an attacker.

In an alternative implementation, the inputs (e.g., selected keys 318, selected mask 316, memory address 312, and/or inputs 310) may also be implemented using an arbitrary finite field GF(2^n) by mapping the inputs into elements of the field.

In one example, the MAC-Lite algorithm 302 may involve two stages. First, an intermediate polynomial-value (Val) is computed as:

Intermediate_Val=addr*k[0][key_index_0]+input_1*k[1][key_index_1]+input_2*k[2][key_index_2]+ ... +input_n*k[n][key_index_n] mod p.

Then the MAC value is computed as:

MAC_value=Intermediate_Val XOR mask[mask_index].

In this manner, the MAC-Lite algorithm 302 may generate an output MAC value 320 that is relatively secure while avoiding multiple rounds of iterative computation each time a memory block is accessed.

Figure 4:
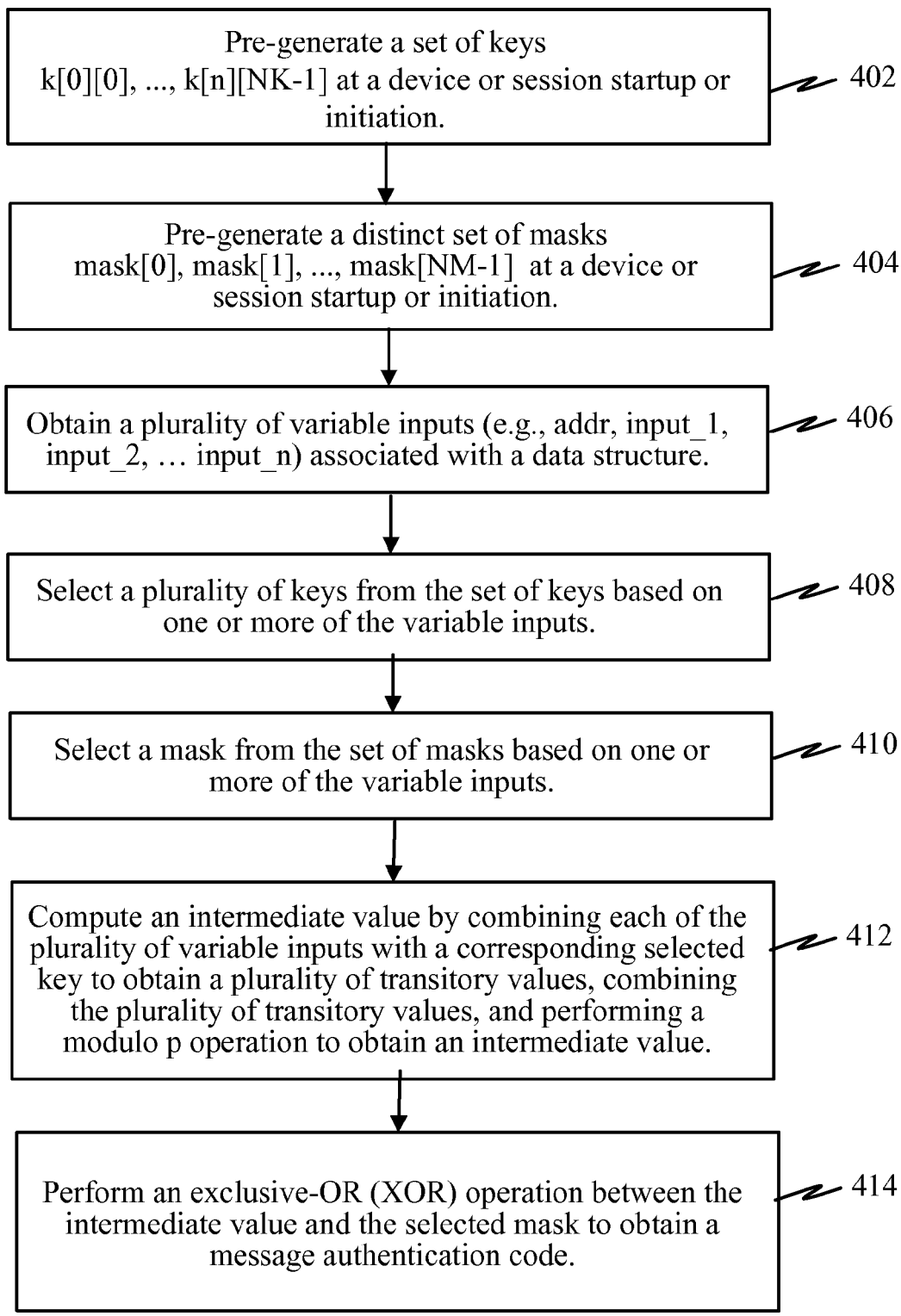
FIG. 4 illustrates one example of a MAC-Lite algorithm that may be implemented to generate a MAC more efficiently than traditional MACs.

FIG. 4 illustrates one example of a MAC-Lite algorithm that may be implemented to generate a MAC more efficiently than traditional MACs. A set of keys k[0][0], ..., k[n][NK−1] are pre-generated at a device or session startup or initiation 402. Similarly, a set of masks mask[0], mask[1], ..., mask[NM−1] are pre-generated at a device or session startup or initiation 404. Obtain a plurality of variable inputs (e.g., addr, input_1, input_2, ... input_n) associated with a data structure 406. A plurality of keys (e.g., k[0][key_index_0], k[1][key_index_1], k[2][key_index_2], and k[n][key_index_n]) from the set of keys are selected based on one or more of the inputs 408. Similarly, a mask (e.g., mask[mask_index]) from the set of masks is selected based on one or more of the variable inputs 410. An intermediate value is computed by combining each of the plurality of variable inputs with a corresponding selected key to obtain a plurality of transitory values, combining the plurality transitory values and performing a module p operation to obtain an intermediate value 412. In various examples, each input and corresponding key may be combined using a logic operation, arithmetic operation (e.g., multiplication), and/or any other operation or function that may be used to combine two values and obtain a transitory value. In one instance, Intermediate_val=addr*k[0][key_index_0]+input_1*k[1][key_index_1]+input_2*k[2][key_index_2]+ ... +input_n*k[n][key_index_n] mod p, where p is a prime number. An exclusive-OR (XOR) operation may then be performed between the intermediate value and the selected mask (e.g., mask[mask_index]) to obtain a message authentication code (MAC) 414.

In one exemplary implementation, the plurality of keys 304 (e.g., set of keys) may be indexed (e.g., selectable by the key_index_x). Similarly, the plurality of masks 308 (e.g., set of masks) may be indexed (e.g., selectable by the mask_index 313). Consequently, the key_index values and/or mask_index may be generated based on one of the variable inputs for a data structure. Various other methods of using a variable input, alone or in combination with other information, may be used in generating the mask_index that changes depending on the variable input (e.g., where the variable input varies may be distinct across data structures). A mask_index may be selected from among the plurality of NM masks 308, where NM is an integer value, and used in the computation of the MAC value 320. Selection of the specific mask_index 313 from among the plurality of masks 308 may be random, pseudo-random, and/or according to some selection algorithm (e.g., as a function of the memory address 312). In one example, each of the masks in the plurality of mask 308 may have the same bit length as the prime number p 314.

In one example, the plurality of keys 304 may be subdivided into subsets 306a, 306b, 306c, each having NK elements (i.e., keys). The plurality of key_index_x may be selected, similar to the selection of the mask_index, based on the same variable input or a different variable input. For instance, the length NK of the subsets 306a, 306b, and 306c of the set of keys 304 may be used to derive a key index value for each of the subsets 306a, 306b, 306c. For example, selection of a specific key_index 313 (e.g., key_index_1, key_index_2, ..., key_index_n) from among the plurality of masks 308 may be random, pseudo-random, and/or according to some selection algorithm (e.g., as a function of the memory address 312). Preferably, the key_index into each of the subsets 306a, 306b, 306c is different to provide greater security against attackers.

Note that the MAC-Lite algorithm 302 may be used in various different contexts, not just for memory integrity. In the case where this MAC-Lite algorithm 302 is used for memory integrity, the MAC 320 may be stored as part of the data structure in the header block for a memory block. Upon subsequently accessing (e.g., reading or writing) the same memory block, a MAC is generated and compared to the previously stored MAC in the header block to make sure they are the same. If the MACs are different, then it may be assumed or concluded that the memory block has been compromised and the memory block may be flushed or ignored. Additionally, the occurrence of a compromised memory block may also indicate that other memory structures within a memory region may have been compromised. Consequently, other memory blocks may also be flushed, ignored, or the system may be restarted.

Figure 5:
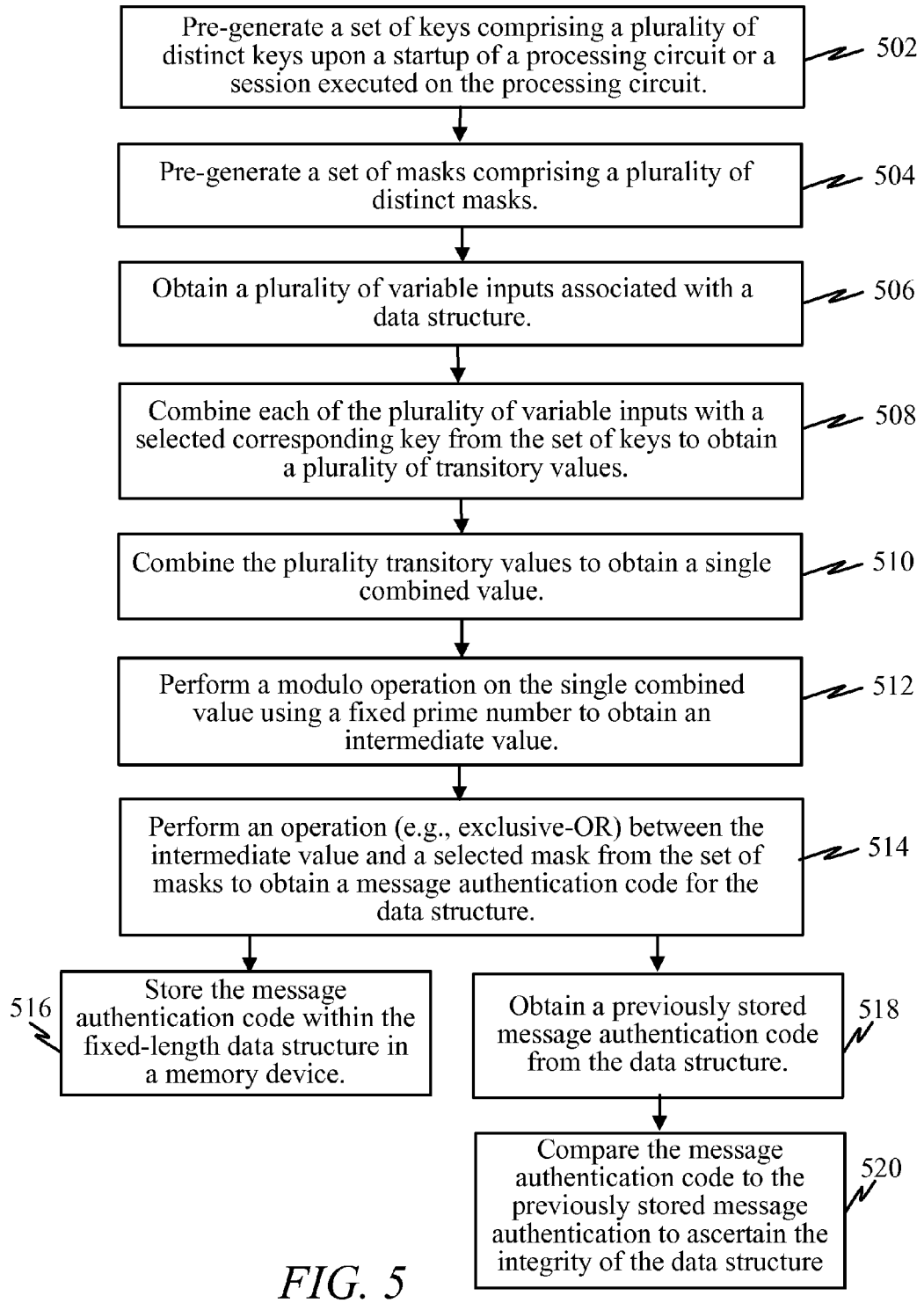
FIG. 5 illustrates a general approach in which an authentication code is generated based on the pre-generation of a distinct set of masks and distinct sets of keys.

FIG. 5 illustrates a general approach in which an authentication code is generated based on the pre-generation of a distinct set of masks and distinct sets of keys. A set of keys, comprising a plurality of distinct keys, are pre-generated 502. For example, the set of keys may be generated upon startup of a processing circuit, boot-up of processing circuit, and/or initiation of a session (e.g., processing session, application session, communication session, etc.) executed on the processing circuit. In some implementations, the set of keys may be subdivided into subsets as illustrated in FIG. 3 (e.g., set of keys 304 and subsets 306a, 306b, and 306c). Similarly, a set of masks, comprising distinct masks, are pre-generated 504. For example, the set of masks may also be generated upon startup of the processing circuit, boot-up of the processing circuit, and/or initiation of the session (e.g., processing session, application session, communication session, etc.) executed on the processing circuit. At least one of the set of keys and set of masks may be generated based on a random value (e.g., from a hardware random bit generator, random number generator based on unpredictable system events, software random number generators, pseudo random-number generators based on seed values, etc.). The set of keys and the set of masks may be kept secret.

A plurality of variable inputs associated with a data structure (e.g., message, memory area, data, file, transmission, header block information, etc.) may be subsequently obtained 506. In some implementations, such variable inputs may include a memory address associated with the data structure or a location of the data structure.

Each of the plurality of variable inputs may be combined (e.g., by a logical or arithmetic operation, such as multiplication) with a selected corresponding key from the set of keys to obtain a plurality of transitory values 508. The plurality transitory values are then combined (e.g., by a logical or arithmetic operation, such as addition, etc.) to obtain a single combined value 510. Each of the plurality of different keys may be selected based on at least one of the plurality of variable inputs. A modulo operation may then be performed on the single combined value using a fixed prime value to obtain an intermediate value 512. In one example, the intermediate value may be computed as the multiplication of each of the plurality of variable inputs with its selected corresponding key to obtain a plurality of transitory values, adding the resulting transitory values, and performing a modulo operation with a pre-selected fixed prime number. The value of each key used may be between zero and the prime number.

An exclusive-OR (XOR) operation may then be performed between the intermediate value and a selected mask from the set of masks to obtain a message authentication code for the data structure 514. The mask may be selected based on at least one of the plurality of variable inputs (e.g., a variable memory address space corresponding to the data structure). Note that, in alternative implementations, a different operation (e.g., logical operation or arithmetic operation) may be employed to combine the intermediate value and the selected mask.

The message authentication code may be stored within the data structure in a memory device 516. In some examples, the data-structure may be a fixed-length data structure.

Subsequently, when the data structure is again accessed, a previously stored message authentication code is obtained from the data structure 518. Then, the message authentication code may be compared to the previously stored message authentication code to ascertain the integrity of the data structure 520.

Figure 6:
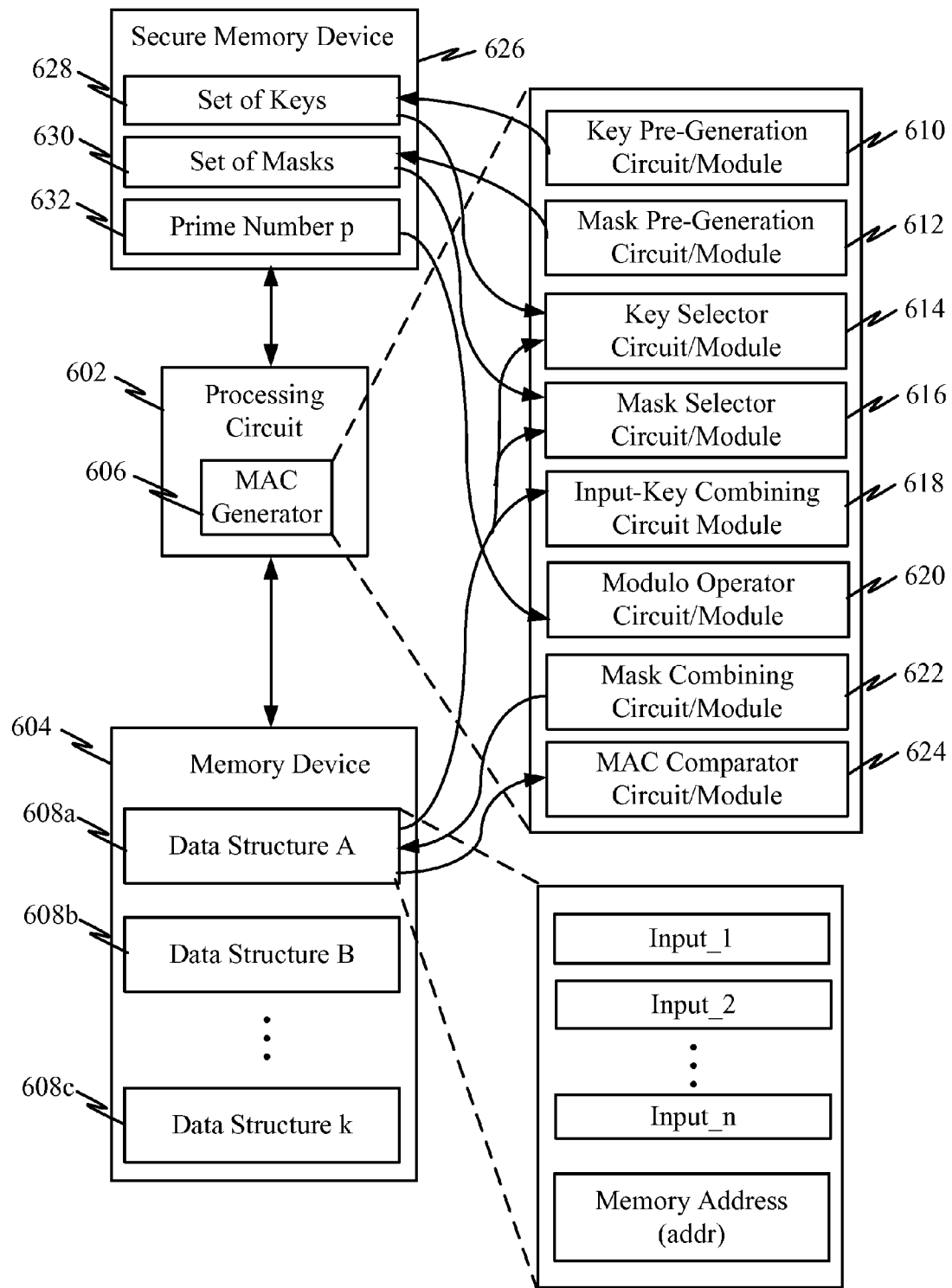
FIG. 6 is a block diagram illustrating an exemplary implementation of a device adapted to perform a MAC-Lite algorithm to secure the integrity of a data structure.

FIG. 6 is a block diagram illustrating an exemplary implementation of a device adapted to perform a MAC-Lite algorithm to secure the integrity of a data structure. The device may include a processing circuit 602 coupled to a separate or integrated memory device 604. The processing circuit 602 may include a message authentication code (MAC) generator 606 that may be adapted to implement a MAC-Lite algorithm on one or more data structures 608a, 608b, 608c, stored in the memory device 604 to secure the integrity of the data structures.

The MAC generator 606 may include a plurality of circuits and/or modules that implement one or more functions or steps of the MAC-Lite algorithm. A key pre-generation circuit/module 610 may randomly or pseudo-randomly generate a set of keys 628, comprising a plurality of keys, upon startup or boot-up of the processing circuit 602 or initiation of a session or application executed on the processing circuit 602. The set of keys 628 may be stored in a secure memory device 626 or a secure location within the processing circuit 602 or the memory device 604. Similarly, a mask pre-generation circuit/module 612 may randomly or pseudo-randomly generate a set of masks 630, comprising a plurality of masks, upon startup or boot-up of the processing circuit 602 or initiation of a session or application executed on the processing circuit 602. The set of masks 630 may be stored in a secure memory device 626 or a secure location within the processing circuit 602 or the memory device 604. The set of masks and/or set of keys in a secure memory device 626 (or location) may be stored for a duration between startups or between (application) sessions. Consequently, the set of masks and/or set of keys is not used for just one read/write operation or for a single memory block. Instead, it is used for all read/write operations and all memory blocks during the cycle (e.g., between startups or between sessions).

Upon accessing a data structure, for a write operation or read operation, a key selector circuit/module 614 may select a plurality of keys from the set of keys 628 based on at least one input associated with the data structure (e.g., a variable memory address for the data structure, etc.). Similarly, a mask selector circuit/module 616 may select a mask from the set of masks 630 based on the at least one input (e.g., a variable memory address for the data structure, etc.) or a different one or more inputs associated with the data structure.

An input and key combining circuit/module 618 may serve to combine the inputs with a corresponding (different) selected key (from the key selector circuit/module 614). For instance, each input may be multiplied with a different selected key and the results may be added together. A modulo operator circuit/module 620 may be applied to the result from the input and key combining circuit/module 618 using a fixed prime number p 632. A mask combining circuit/module 622 may take the result from the modulo operator circuit/module 622 and apply the selected mask (from the mask selector circuit/module 616) to generate a MAC-Lite value for the data structure.

A MAC comparator circuit/module 624 may serve to check the integrity of a data structure by comparing a previously stored MAC value for the data structure to a dynamically computed MAC value (from the mask combining circuit/module 622).

Figure 7:
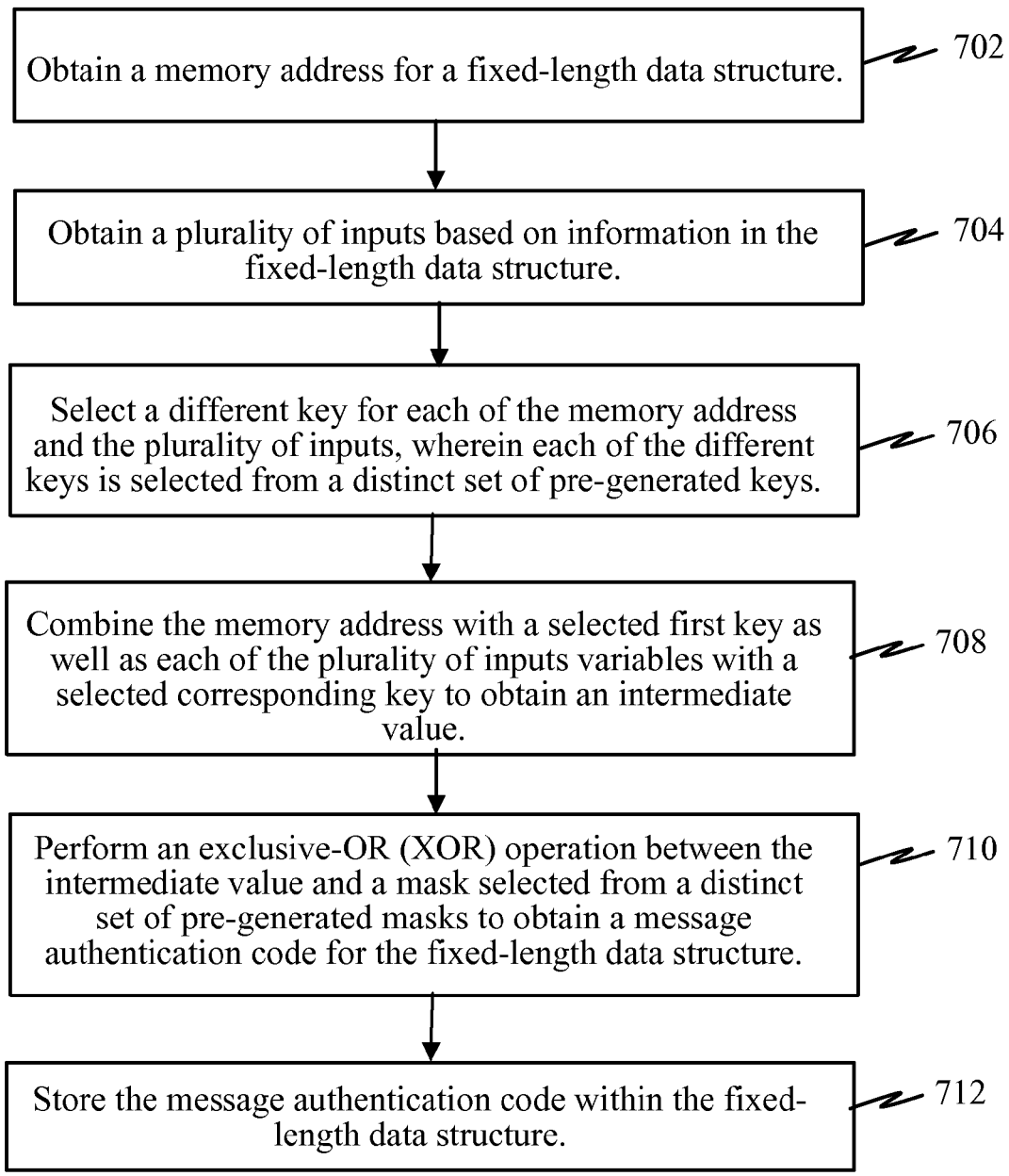
FIG. 7 illustrates an example of generating an authentication code for memory spaces based on the pre-generation of a distinct set of masks and distinct sets of keys.

FIG. 7 illustrates an example of generating an authentication code for memory spaces based on the pre-generation of a distinct set of masks and distinct sets of keys. A memory address is obtained for a fixed-length data structure 702. A plurality of inputs is also obtained based on information in the fixed-length data structure 704. A different key is selected for each of the memory address and the plurality of variable inputs, wherein each of the different keys is selected from a distinct set of pre-generated keys 706. In one example, each of the plurality of different keys and/or the mask may be selected based on (e.g., as a function of) the memory address. The distinct set of pre-generated keys may have been generated upon startup of a processing circuit/device or upon initiation of a session executed on the processing circuit/device.

The memory address is combined with a selected first key as well as each of the plurality of variable inputs with a selected corresponding key to obtain an intermediate value 708. The intermediate value may be computed as the multiplication of the memory address and the first key plus the multiplication of each of the plurality of variable inputs with its selected corresponding key and performing a modulo operation with a pre-selected fixed prime number. Each key used may be between zero and the prime number.

An exclusive-OR (XOR) operation is performed between the intermediate value and a mask selected from a distinct set of pre-generated masks to obtain an authentication code for the fixed-length data structure 710. The distinct set of pre-generated masks may have been generated upon startup of the processing circuit/device or upon initiation of the session executed on the processing circuit/device. The distinct set of keys and the distinct set of masks may be kept secret.

The authentication code may then be stored within the fixed-length data structure 712. For instance, the authentication code may be stored in a header block for the fixed-length data structure. The memory address may correspond to an address of a header block for the fixed-length data structure.

In a subsequent access of the fixed-length data structure, its integrity may be verified by regenerating the message authentication code and comparing it to a previously stored message authentication code for the same data structure.

One or more of the components, steps, features, and/or functions illustrated in the Figures may be rearranged and/or combined into a single component, step, feature or function or embodied in several components, steps, or functions. Additional elements, components, steps, and/or functions may also be added without departing from the invention. The apparatus, devices, and/or components illustrated in the Figures may be configured to perform one or more of the methods, features, or steps described in the Figures. The algorithms described herein may also be efficiently implemented in software and/or embedded in hardware.

Moreover, in one aspect of the disclosure, the processing circuit 102, 202, and/or 602 illustrated in FIGS. 1, 2, and 6 may be a specialized processor (e.g., an application specific integrated circuit (e.g., ASIC)) that is specifically designed and/or hard-wired to perform the algorithms, methods, and/or steps described in FIGS. 3, 4, 5, and/or 7. Thus, such a specialized processor (e.g., ASIC) may be one example of a means for executing the algorithms, methods, and/or steps described in FIGS. 3, 4, 5, and/or 7. The processor-readable storage medium may store instructions that when executed by a specialized processor (e.g., ASIC) causes the specialized processor to perform the algorithms, methods, and/or steps described herein.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method of generating an authentication code, comprising:
   pre-generating a set of keys comprising a plurality of distinct keys upon a startup of a processing circuit or an initiation of a session executed on the processing circuit;
   pre-generating a set of masks comprising a plurality of distinct masks;
   obtaining a plurality of variable inputs associated with a fixed-length data structure;
   combining each of the plurality of variable inputs with a selected corresponding key from the set of keys to obtain a plurality of transitory values;
   combining the plurality of transitory values to obtain an intermediate value; and
   performing an operation between the intermediate value and a selected mask from the set of masks to obtain a message authentication code for the fixed-length data structure.

2. The method of claim 1, wherein the set of masks are also pre-generated upon the startup of the processing circuit or the initiation of the session executed on the processing circuit.

3. The method of claim 1, wherein at least one of the set of keys and set of masks are generated based on a random value.

4. The method of claim 1, wherein the plurality transitory values are combined by:
   adding the plurality of transitory values to obtain a combined value, and
   performing a modulo operation with a pre-selected fixed prime number on the combined value to obtain the intermediate value.

5. The method of claim 4, wherein the value of each key in the set of keys is between zero and the pre-selected fixed prime number.

6. The method of claim 4, wherein the operation between the intermediate value and the selected mask is a bitwise exclusive-OR operation.

7. The method of claim 1, wherein the mask and each of the selected corresponding keys are selected based on at least one of the plurality of variable inputs.

8. The method of claim 7, wherein the at least one of the plurality of variable inputs is a memory address associated with the fixed-length data structure.

9. The method of claim 8, wherein each of the selected corresponding keys is selected based on the memory address.

10. The method of claim 8, wherein the selected mask is selected based on the memory address.

11. The method of claim 1, wherein the set of keys are subdivided into subsets of keys and only a subset of keys is selected from any single subset of keys to compute the message authentication code.

12. The method of claim 1, further comprising:
    storing at least one of the set of masks and set of keys in a secure memory location for a duration between startups or between sessions.

13. The method of claim 1, further comprising:
    storing the message authentication code within the fixed-length data structure in a memory device.

14. The method of claim 13, wherein the message authentication code is stored in a header block for the fixed-length data structure.

15. The method of claim 1, further comprising:
    obtaining a previously stored message authentication code from the data structure; and
    comparing the message authentication code to the previously stored message authentication code to ascertain the integrity of the data structure.

16. A device comprising:
    a memory device to store a fixed-length data structure;
    a processing circuit coupled to the memory device,
    the processing circuit adapted to:
      pre-generate a set of keys comprising a plurality of distinct keys upon a startup of a processing circuit or an initiation of a session executed on the processing circuit;
      pre-generate a set of masks comprising a plurality of distinct masks;
      obtain a plurality of variable inputs associated with the fixed-length data structure;
      combine each of the plurality of variable inputs with a selected corresponding key from the set of keys to obtain a plurality of transitory values;
      combine the plurality transitory values to obtain an intermediate value; and
      perform an operation between the intermediate value and a selected mask from the set of masks to obtain a message authentication code for the fixed-length data structure.

17. The device of claim 16, wherein the set of masks are also pre-generated upon the startup of the processing circuit or the initiation of the session executed on the processing circuit.

18. The device of claim 16, wherein at least one of the set of keys and set of masks are generated based on a random value.

19. The device of claim 16, wherein the plurality transitory values are combined by:
    adding the plurality of transitory values to obtain a combined value, and
    performing a modulo operation with a pre-selected fixed prime number on the combined value to obtain the intermediate value.

20. The device of claim 19, wherein the value of each key in the set of keys is between zero and the pre-selected fixed prime number.

21. The device of claim 19, wherein the operation between the intermediate value and the selected mask is a bitwise exclusive-OR operation.

22. The device of claim 16, wherein the mask and each of the selected corresponding keys are selected based on at least one of the plurality of variable inputs.

23. The device of claim 22, wherein the at least one of the plurality of variable inputs is a memory address associated with the fixed-length data structure.

24. The device of claim 23, wherein each of the selected corresponding keys is selected based on the memory address.

25. The device of claim 23, wherein the selected mask is selected based on the memory address.

26. The device of claim 16, wherein the set of keys are subdivided into subsets of keys and only a subset of keys is selected from any single subset of keys to compute the message authentication code.

27. The device of claim 16, wherein the processing circuit is further adapted to:
    store at least one of the set of masks and set of keys in a secure memory location for a duration between startups or between sessions.

28. The device of claim 16, wherein the processing circuit is further adapted to:
    store the message authentication code within the fixed-length data structure in a memory device.

29. The device of claim 28, wherein the message authentication code is stored in a header block for the fixed-length data structure.

30. The device of claim 16, wherein the processing circuit is further adapted to:
obtain a previously stored message authentication code from the data structure; and
compare the message authentication code to the previously stored message authentication code to ascertain the integrity of the data structure.

31. A device, comprising:
means for pre-generating a set of keys comprising a plurality of distinct keys upon a startup of a processing circuit or an initiation of a session executed on the processing circuit;
means for pre-generating a set of masks comprising a plurality of distinct masks;
means for obtaining a plurality of variable inputs associated with a fixed-length data structure;
means for combining each of the plurality of variable inputs with a selected corresponding key from the pre-generated set of keys to obtain a plurality of transitory values;
means for combining the plurality transitory values to obtain an intermediate value; and
means for performing an operation between the intermediate value and a selected mask from the set of pre-generated masks to obtain a message authentication code for the fixed-length data structure.

32. The device of claim 31, further comprising:
means for storing at least one of the set of masks and set of keys in a secure memory location for a duration between startups or between sessions.

33. The device of claim 31, further comprising:
means for storing the message authentication code within the fixed-length data structure in a memory device.

34. The device of claim 33, wherein the message authentication code is stored in a header block for the fixed-length data structure.

35. The device of claim 31, further comprising:
means for obtaining a previously stored message authentication code from the data structure; and
means for comparing the message authentication code to the previously stored message authentication code to ascertain the integrity of the data structure.

36. A non-transitory processor-readable storage medium having one or more instructions which when executed by at least one processing circuit causes the at least one processing circuit to:
pre-generate a set of keys comprising a plurality of distinct keys upon a startup of a processing circuit or an initiation of a session executed on the processing circuit;
pre-generate a set of masks comprising a plurality of distinct masks;
obtain a plurality of variable inputs associated with a fixed-length data structure;
combine each of the plurality of variable inputs with a selected corresponding key from the set of keys to obtain a plurality of transitory values;
combine the plurality transitory values to obtain an intermediate value; and
perform an operation between the intermediate value and a selected mask from the set of masks to obtain a message authentication code for the fixed-length data structure.

37. The non-transitory processor-readable storage medium of claim 36, further having one or more instructions which when executed by at least one processing circuit causes the at least one processing circuit to:
store the message authentication code within the fixed-length data structure in a memory device.

38. The non-transitory processor-readable storage medium of claim 36, further having one or more instructions which when executed by at least one processing circuit causes the at least one processing circuit to:
obtain a previously stored message authentication code from the data structure; and
compare the message authentication code to the previously stored message authentication code to ascertain the integrity of the data structure.

* * * * *